(12) United States Patent
Gundam et al.

(10) Patent No.: US 9,766,900 B2
(45) Date of Patent: Sep. 19, 2017

(54) BOOTING A MULTI-NODE COMPUTER SYSTEM FROM A PRIMARY NODE DYNAMICALLY SELECTED BASED ON SECURITY SETTING CRITERIA

(71) Applicant: Lenovo Enterprise Solutions (Singapore) Pte. Ltd., Singapore (SG)

(72) Inventors: Raghuswamyreddy Gundam, Austin, TX (US); Shiva R. Dasari, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 174 days.

(21) Appl. No.: 14/251,811

(22) Filed: Apr. 14, 2014

(65) Prior Publication Data

US 2015/0294116 A1 Oct. 15, 2015

Related U.S. Application Data

(63) Continuation of application No. 14/249,653, filed on Apr. 10, 2014, now abandoned.

(51) Int. Cl.
*G06F 9/44* (2006.01)
*G06F 21/62* (2013.01)
(Continued)

(52) U.S. Cl.
CPC ............ *G06F 9/441* (2013.01); *G06F 9/4405* (2013.01); *G06F 21/575* (2013.01);
(Continued)

(58) Field of Classification Search
CPC ...... G06F 9/5061; G06F 8/5061; G06F 21/57; G06F 9/4401; G06F 9/4408; G06F 21/604; H04L 9/00
(Continued)

(56) References Cited

U.S. PATENT DOCUMENTS 6,292,508 B1 * 9/2001 Hong .................... H04B 1/7156
375/134
6,477,611 B1 * 11/2002 Chang .................... G06F 13/385
710/300

(Continued)

FOREIGN PATENT DOCUMENTS

WO WO2013101154 A1 7/2013

OTHER PUBLICATIONS

Hans Lohr et al., "Enhancing Grid Security Using Trusted Virtualization*", Springer-Verlag Berlin Heidelberg 2007, B. Xiao et al. (Eds.): ATC 2007, LNCS 4610, pp. 372-384. This document only identifies the year of publication (without the month), but the year of publication is sufficiently earlier than the effective U.S. filing date and any foreign priority date so that the particular month of publication is not in issue. See MPEP 609.04(a).

(Continued)

*Primary Examiner* — Thomas Lee
*Assistant Examiner* — Santosh R Poudel
(74) *Attorney, Agent, or Firm* — Jeffrey L. Streets

(57) ABSTRACT

A method includes identifying, from among nodes within a multi-node system, a node that has a security setting satisfying a security setting criteria, booting the multi-node system with the identified node as the primary node, and operating the multi-node system using the security setting of the identified node. Accordingly, the method may provide dynamic selection of a primary node based upon the security setting criteria and the security settings of the nodes within the multi-node system. Optionally, the security setting of each node is stored in a trusted platform module. In non-limiting examples, the security setting criteria may be the highest security setting among all nodes within the multi-node system or a predetermined minimum security setting, such as a trusted execution technology setting.

20 Claims, 6 Drawing Sheets

(51) Int. Cl.
    *G06F 21/57*    (2013.01)
    *G06F 21/72*    (2013.01)
    *H04L 12/24*    (2006.01)

(52) U.S. Cl.
    CPC ........ *G06F 21/629* (2013.01); *G06F 21/6218* (2013.01); *G06F 21/72* (2013.01); *H04L 41/0803* (2013.01)

(58) Field of Classification Search
    USPC .......................................................... 713/2
    See application file for complete search history.

(56) References Cited

U.S. PATENT DOCUMENTS

| | | | | |
|---|---|---|---|---|
| 7,146,497 | B2* | 12/2006 | Almeida | G06F 15/177 710/302 |
| 7,738,504 | B1* | 6/2010 | Deaner | G06F 13/36 370/400 |
| 7,984,286 | B2 | 7/2011 | Zimmer et al. | |
| 8,015,154 | B1* | 9/2011 | Anderson | G06F 17/30306 707/638 |
| 8,539,571 | B2* | 9/2013 | Smith | H04L 63/083 370/392 |
| 8,849,764 | B1* | 9/2014 | Long | G06F 11/1451 707/646 |
| 9,015,518 | B1* | 4/2015 | Wenzel | G06F 11/1479 714/4.1 |
| 2003/0233492 | A1* | 12/2003 | Schelling | G06F 9/4405 713/375 |
| 2005/0094600 | A1* | 5/2005 | Zhang | H04L 1/1887 370/331 |
| 2005/0144407 | A1* | 6/2005 | Colgrove | G06F 11/2064 711/162 |
| 2005/0144506 | A1* | 6/2005 | Takada | G06F 11/0724 714/4.21 |
| 2006/0041882 | A1* | 2/2006 | Shah | G06F 15/177 717/171 |
| 2007/0157011 | A1* | 7/2007 | Kumar | G06F 11/0724 713/1 |
| 2008/0244693 | A1* | 10/2008 | Chang | G06F 21/554 726/1 |
| 2008/0317049 | A1* | 12/2008 | Sinicrope | H04L 45/02 370/401 |
| 2009/0073896 | A1* | 3/2009 | Gillingham | G06F 9/5061 370/255 |
| 2009/0077478 | A1* | 3/2009 | Gillingham | H04L 41/0803 715/763 |
| 2009/0077621 | A1* | 3/2009 | Lang | H04L 63/20 726/1 |
| 2009/0172639 | A1 | 7/2009 | Natu et al. | |
| 2009/0172806 | A1* | 7/2009 | Natu | G06F 21/85 726/16 |
| 2009/0232037 | A1* | 9/2009 | Dixit | H04W 52/0225 370/311 |
| 2009/0327686 | A1* | 12/2009 | Kochar | G06F 21/572 713/100 |
| 2010/0023768 | A1* | 1/2010 | Lin | H04W 12/06 713/171 |
| 2010/0054241 | A1* | 3/2010 | Shah | H04L 45/00 370/389 |
| 2010/0082960 | A1 | 4/2010 | Grobman et al. | |
| 2010/0125731 | A1* | 5/2010 | Dasari | G06F 9/5061 713/155 |
| 2010/0169667 | A1 | 7/2010 | Dewan | |
| 2011/0029672 | A1* | 2/2011 | Agneeswaran | G06F 9/5044 709/226 |
| 2011/0029974 | A1 | 2/2011 | Broyles et al. | |
| 2011/0296488 | A1 | 12/2011 | Dandekar et al. | |
| 2013/0081100 | A1* | 3/2013 | Sreehari | G06F 15/16 726/1 |
| 2013/0152191 | A1* | 6/2013 | Bright | H04L 63/02 726/14 |
| 2014/0341079 | A1* | 11/2014 | Lin | H04L 41/12 370/255 |
| 2015/0019547 | A1* | 1/2015 | Thalapathy | G06F 17/30867 707/732 |

OTHER PUBLICATIONS

Nuno Santos et al., "Towards Trusted Cloud Computing", MPI-SWS, 2009, 5 pages. This document only identifies the year of publication (without the month), but the year of publication is sufficiently earlier than the effective U.S. filing date and any foreign priority date so that the particular month of publication is not in issue. See MPEP 609.04(a).

* cited by examiner

Mulit-node TXT State – Static Primary Node

| Node A TXT State | Node B TXT State | Multi-node TXT State |
|---|---|---|
| Disabled | Disabled | Disabled |
| Disabled | Enabled | Disabled |
| Enabled | Disabled | Enabled |
| Enabled | Enabled | Enabled |

Multi-node system booted with lowest security setting

FIG. 3A

Mulit-node TXT State – Dynamic Primary Node Selection

| Node A TXT State | Node B TXT State | Multi-node TXT State |
|---|---|---|
| Disabled | Disabled | Disabled |
| Disabled | Enabled | Enabled |
| Enabled | Disabled | Enabled |
| Enabled | Enabled | Enabled |

Multi-node system booted with highest security setting

FIG. 3B

BOOTING A MULTI-NODE COMPUTER SYSTEM FROM A PRIMARY NODE DYNAMICALLY SELECTED BASED ON SECURITY SETTING CRITERIA

CROSS-REFERENCE TO RELATED APPLICATIONS

This application is a continuation of U.S. patent application Ser. No. 14/249,653 filed on Apr. 10, 2014, which application is incorporated by reference herein.

BACKGROUND

Field of the Invention

The present invention relates to security settings in a multi-node computer system.

Background of the Related Art

Computer processors may be interconnected to achieve greater performance. The greater performance may include faster memory access or increased data handling capacity. An interconnection between two or more processors may be referred to as a bus, such as with the front side bus (FSB), or a point to point interconnect, such as with the Intel Corporation's QUICKPATH INTERCONNECT (QPI). When an interconnection is made between processors, the processors are referred to as being scaled and a cable used to complete the interconnection is referred to as a scalability cable.

Compute nodes may be scaled together and work together as a single multi-node system. The multi-node system boots using the basic input output system (BIOS) of only one of the compute nodes, which is referred to as the primary node. Other compute nodes within the multi-node system are referred to as secondary nodes. Typically, a user will use a system management interface to identify one of the compute nodes to serve as the primary node.

The compute nodes that are connected together to form a multi-node system may have different basic input output system (BIOS) versions and different security settings. However, the BIOS version and security settings of the primary node are applied to the multi-node system as a whole. If a user desires a different BIOS version or security settings, then it is necessary to update the BIOS version or change the security settings on the primary node.

BRIEF SUMMARY

One embodiment of the present invention provides a method that comprises identifying, from among nodes within a multi-node system, a node that has a security setting satisfying a security setting criteria, booting the multi-node system with the identified node as the primary node, and operating the multi-node system using the security setting of the identified node.

BRIEF DESCRIPTION OF THE SEVERAL VIEWS OF THE DRAWINGS

FIG. 3A is a logic table for a multi-node system having Node A as the primary node regardless of the security settings of Nodes A and B.

FIG. 3B is a logic table for a multi-node system where the node having a TXT state enabled is designated as the primary node.

DETAILED DESCRIPTION

Figure 1:
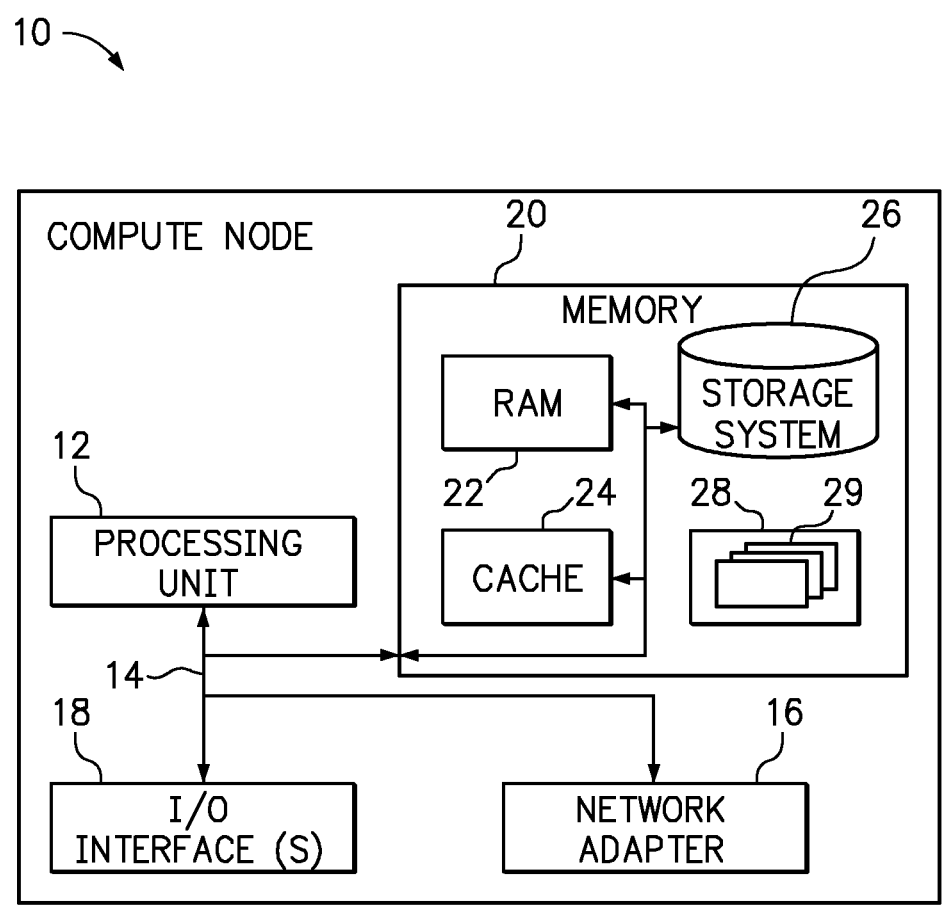
FIG. 1 is a block diagram of a generic compute node.

One embodiment of the present invention provides a method that comprises identifying, from among nodes within a multi-node system, a node that has a security setting satisfying a security setting criteria, booting the multi-node system with the identified node as the primary node, and operating the multi-node system using the security setting of the identified node.

The multi-node system may include any number of (two or more) compute nodes. While the multi-node system may include exactly two nodes, the multi-node system may alternatively include more than two nodes. Optionally, the nodes of the multi-node system may be fully meshed, which means that there is a scalability cable coupled directly between each pairing of nodes within the multi-node system. Specifically, wherein there are n nodes, a fully meshed system will require $(n-1)n/2$ connections.

In one embodiment, the security setting of the primary node is stored in a trusted platform module. Preferably, each node within the multi-node system has a trusted platform module and stores a security setting in the trusted platform module.

The security setting criteria may be any security setting criteria that might be implemented in one or more of the nodes. In a first example, the security setting criteria may be the highest security setting among all nodes within the multi-node system. Accordingly, applying this security setting criteria, the node having the highest security setting will be identified as the primary node and the multi-node system will be booted using the security setting of the identified node. Using the highest security setting means that none of the nodes will have their security reduced as a result of being connected into the multi-node system. In fact, the security of one or more of the nodes may be increased as a result of booting the multi-node system with the highest security setting. In a second example, the security setting criteria may be a predetermined minimum security setting, such as a trusted execution technology setting. Optionally, the predetermined minimum security setting requires that trusted execution technology is enabled or otherwise authenticates the node and an operating system of the node.

Trusted eXecution Technology (TXT) is a feature provided by Intel CPU and firmware/BIOS. TXT provides attestation that a platform and its operating system (OS) are authentic, assurance that an authentic OS starts in a trusted environment (i.e., considered a trusted OS), and provide the trusted OS with additional security capabilities not available to an unproven OS. TXT uses a Trusted Platform Module (TPM) and cryptographic techniques to provide measurements of software and platform components so that system software, as well as local and remote management applications, may use those measurements to make trust decisions. This technology is based on an industry initiative by the Trusted Computing Group (TCG) to promote safer computing by defending against software-based attacks aimed at corrupting system and/or BIOS code, or modifying the platform's configuration. The Trusted Platform Module (TPM) as specified by the TCG provides many security functions including special registers, referred to a Platform Configuration Registers (PCRs), which hold various measurements in a shielded location in a manner that prevents spoofing. These measurements consist of a cryptographic hash using a Secure Hashing Algorithm (SHA) on code, data structures, configuration, information, or anything that can be loaded into memory. TCG requires that code not be executed until after it has been measured. Whether TXT is enabled or disabled is user configurable. In a multi-node system, all nodes come up as TXT enabled if the primary node has TXT enabled, or all nodes come up as TXT disabled if the primary node has TXT is disabled. These security settings, such TXT enable/disable, verified boot enable/disable, UEFI 2.3.1 secure boot enable disable or any other security related BIOS setting, can be stored outside of the TPM. For example, the TXT enable/disable setting is stored in the CMOS.

In another embodiment, the method may establish a default primary node, and boot the multi-node system with the default primary node in response to none of the nodes having a security setting satisfying the security setting criteria. Optionally, the default primary node may be established by receiving user input identifying the default primary node.

In yet another embodiment, the method may set a field-programmable gate array (FPGA) in each compute node to point to the basic input output system of the compute node that is identified as the primary node. Each field-programmable gate array is preferably set by an integrated management module within the same compute node as the respective field-programmable gate array. The coordinated control of the FPGA's may occur through communication between the integrated management modules (IMMs) of each node, which may communicate via the scalability cables (or throughput of band connection) connecting each of the nodes within the multi-node system or via a common management node. Each compute node preferably has an integrated management module, so that each of the integrated management modules in the multi-node system coordinate control of the field-programmable gate arrays to point to one of the compute nodes as the primary node.

Optionally, the step of identifying, from among nodes within a multi-node system, a node that has a security setting satisfying a security setting criteria, may include sequentially designating the nodes as the primary node until reaching a node that has a security setting satisfying the securing setting criteria. Where a default primary node has been established, the method may boot the multi-node system with the default primary node in response to none of the nodes having a security setting satisfying the security setting criteria.

One embodiment of the present invention provides a computer program product for controlling an autonomous vehicle, the computer program product comprising a computer readable storage medium having program instructions embodied therewith. The program instructions are executable by a processor to cause the processor to perform a method comprising identifying, from among nodes within a multi-node system, a node that has a security setting satisfying a security setting criteria, booting the multi-node system with the identified node as the primary node; and operating the multi-node system using the security setting of the identified node.

The foregoing computer program products may further include program instructions for implementing or initiating any one or more aspects of the methods described herein. Accordingly, a separate description of the methods will not be duplicated in the context of a computer program product.

FIG. 1 is a schematic diagram of a generic compute node 10 that provides one non-limiting example of a compute node that may be used in accordance with one or more embodiments of the present invention. The components of the compute node 10 may include, but are not limited to, one or more processors or processing units 12, a system memory 20, and a bus 14 that couples various system components including system memory 20 to the processing unit 12. The bus 14 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The compute node 10 typically includes a variety of computer readable media. Such media may be any available media that is accessible by the compute node 10, and it includes both volatile and non-volatile media, removable and non-removable media.

The system memory 20 can include computer readable media in the form of volatile memory, such as random access memory (RAM) 22 and/or cache memory 24. The compute node 10 may further include other removable/non-removable, volatile/non-volatile computer system storage media. By way of example only, a storage system 26 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to a bus 14 by one or more data media interfaces. As will be further depicted and described below, the memory 20 may include at least one computer program product having a set (e.g., at least one) of program modules that are configured to carry out the functions of embodiments of the invention.

The program/utility 28, having a set (at least one) of program modules 29, may be stored in memory 20 by way of example, and not limitation, as well as an operating system, one or more application programs, other program modules, and program data. Each of the operating system, one or more application programs, other program modules, and program data or some combination thereof, may include an implementation of a networking environment. The program modules 29 generally carry out the functions and/or methodologies of embodiments of the invention as described herein.

The compute node 10 may also communicate with one or more external devices, such as a keyboard, a pointing device, a display, or one or more other devices that enable a user to interact with the compute node 10. The compute node 10 may also include other devices, such as a network card or modem that enable the compute node 10 to communicate with one or more other computing devices. Such communication can occur via Input/Output (I/O) interfaces 18. Still further, the compute node 10 can communicate with one or more networks, such as a local area network (LAN), a general wide area network (WAN), and/or a public network (e.g., the Internet) via a network adapter 16. As depicted, the network adapter 16 communicates with the other components of the compute node 10 via the bus 14. It should be understood that although not shown, other hardware and/or software components could be used in conjunction with the compute node 10. Examples, include, but are not limited to, microcode, device drivers, redundant processing units, external disk drive arrays, RAID systems, tape drives, and data archival storage systems.

Figure 2A:
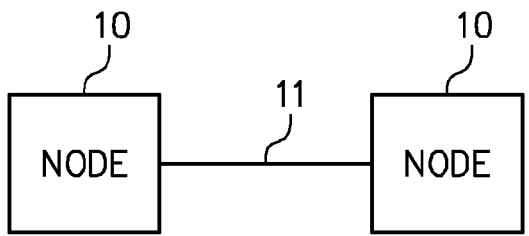
FIGS. 2A-2C are diagrams multi-node computer systems having various numbers of nodes.
Figure 2B:
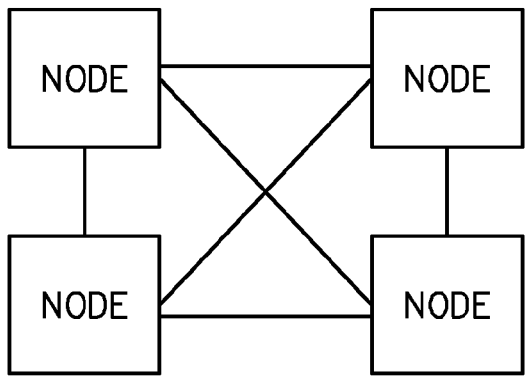
Figure 2C:
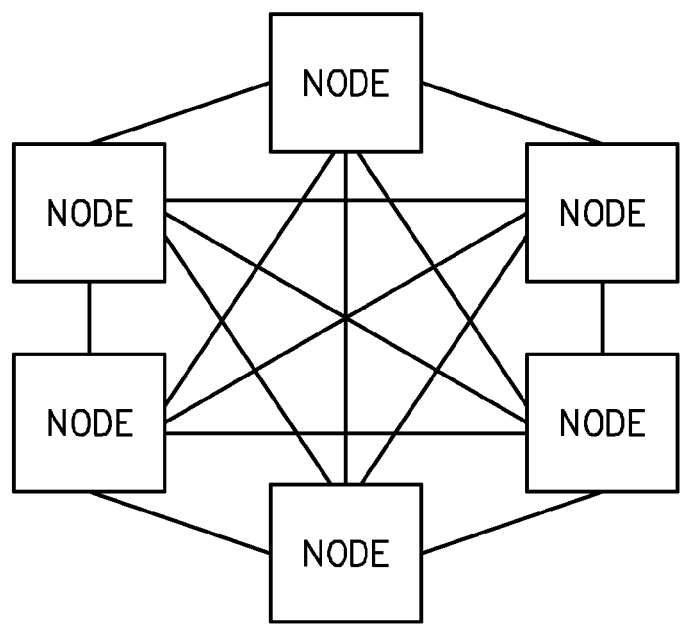

FIGS. 2A-2C are diagrams of multi-node computer systems having various numbers of nodes. FIG. 2A is a multi-node computer system including just two compute nodes, such as two of the compute nodes 10 of FIG. 1. The line between the two nodes represents a scalability connection 11, which may be a scalability cable. FIG. 2B is a multi-node computer system including four nodes and a scalability connection directly between each pairing of the nodes. Such a multi-node system may be said to be "fully meshed." FIG. 2C is a multi-node computer system including six nodes that are fully meshed. The methods of the present invention may be implemented in multi-node systems having any number of two or more nodes. In a fully meshed multi-node system having n nodes, there will be (n−1)n/2 connections.

FIG. 3A is a logic table for a multi-node system having Node A as the primary node regardless of the security settings of Nodes A and B. In other words, the primary node is static. As shown, the security setting is a trusted execution technology (TXT) state, which is either TXT enabled or TXT disabled. Since Node A is always the primary node, the multi-node system will always boot with the same TXT state as Node A regardless of the TXT state of Node B. In the instance where Node A has TXT disabled and Node B has TXT enabled, the multi-node system will have TXT disabled. This is the lowest security setting among the nodes and Node B will have its security setting reduced.

FIG. 3B is a logic table for a multi-node system where the node having a TXT state enabled is designated as the primary node. Accordingly, the primary node is dynamically selected depending on which node (here, either Node A or Node B) has TXT enabled. Note that the table in FIG. 3B differs from the table in FIG. 3A in the second row, where Node B would be designated as the primary node so that the multi-node system will have TXT enabled.

Figure 4:
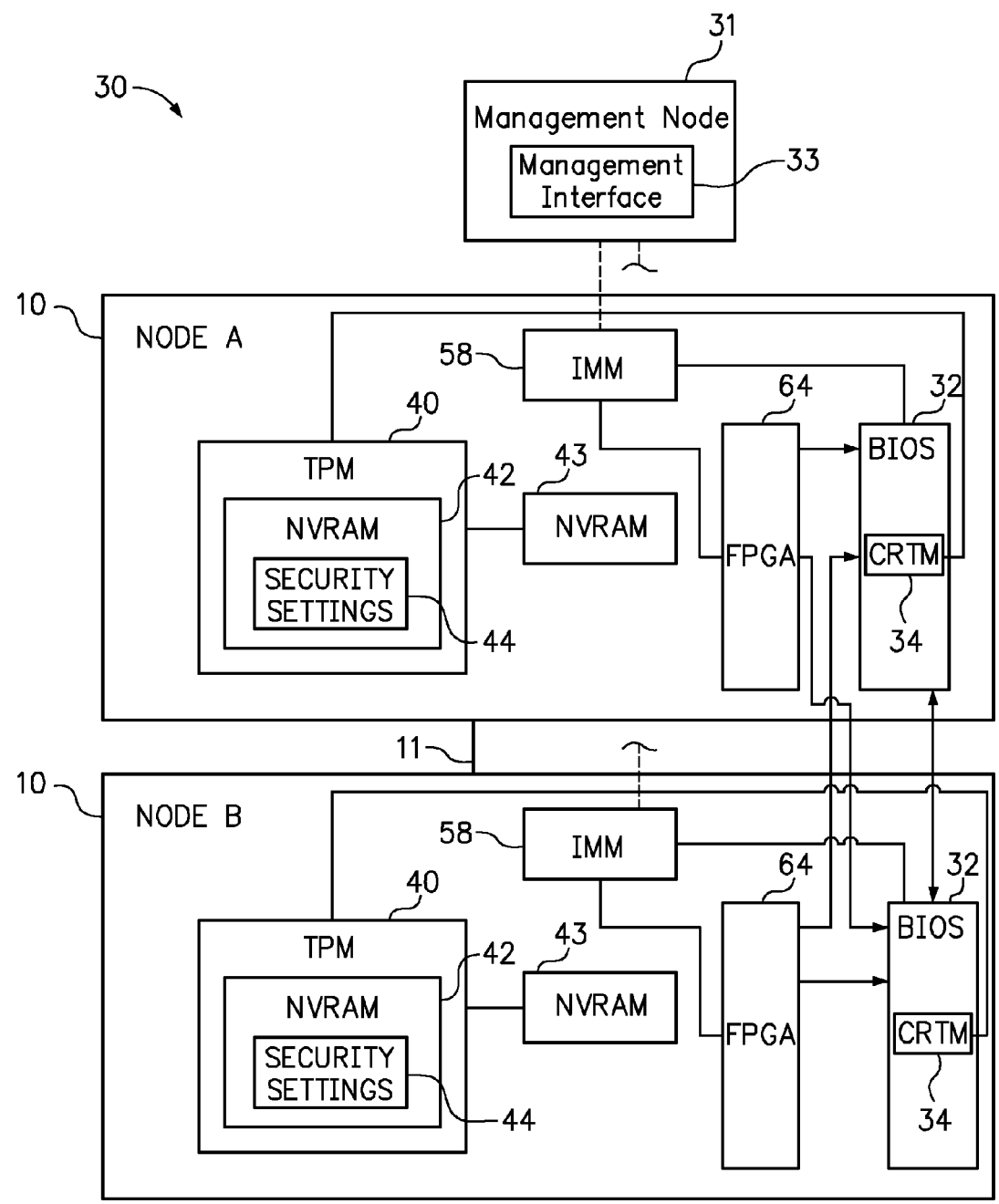
FIG. 4 is a block diagram of two compute nodes forming a single multi-node system.

FIG. 4 is a block diagram of two compute nodes 10 forming a single multi-node system 30. Many of the components of the two compute nodes 10, such as those shown in FIG. 1, are not shown in FIG. 4 in order to highlight components that implement an embodiment of the invention. It should be recognized that the two compute nodes 10 may have, but are not required to have, identical hardware and perhaps also identical firmware and software. As shown, the upper or first compute node (NODE A) and the lower or second compute node (NODE B) each have a BIOS 32 including Core Root of Trust for Measurement (CRTM) code 34, although they may be different.

The first compute node and a second compute node are scaled together by a connection 11 to form a single multi-node system. Only one of the compute nodes may be the primary node at any one point in time, and the other node(s) are secondary nodes. The multi-node system 30 will boot with the BIOS and security settings of the node that has been dynamically selected as the primary node. Each of the first and second compute nodes 10 includes a trusted platform module 40, which includes non-volatile random access memory (NVRAM) 42. Security settings can be stored in the NVRAM of the TPM, as shown, or can be stored outside of the TPM in complementary metal oxide semiconductor (CMOS), the integrated management module (IMM), or another NVRAM 43.

Each of the first and second compute nodes 10 further includes a field programmable gate array (FPGA) 64 for selectively pointing to the BIOS of the compute node that is the primary node. Each FPGA 64 receives an instruction from the IMM 58 of the same node indicating whether that compute nodes 10 should use the BIOS 32 and security setting 44 of the first compute node (NODE A) or the BIOS 32 and security setting 44 of the second compute node (NODE B). The IMM 58 of the first compute node 10 (NODE A) and the IMM 58 of the second compute node 10 (NODE B) coordinate control of the FPGAs in their respective compute nodes, so that each FPGA 64 in the multi-node system 30 will point to the BIOS of the compute node that is current designated as the primary node. The coordinated control of the FPGA's may occur through communication between the integrated management modules (IMMs) of each node, which may communicate via the scalability cables connecting each of the nodes within the multi-node system or via a common management node.

When the user selects one of the compute nodes as the primary, all other nodes become secondary. For example, a user may provide input to the system management interface 33 of the management node 31 selecting the primary node. The compute node that is currently identified as the primary node is the one from which BIOS code is executed when the multi-node system 30 is booted. Accordingly, CPUs in the primary and secondary nodes all run code from the BIOS flash chip located on the primary node. The Core Root of Trust for Measurement (CRTM) code 34 is the initial part of the BIOS 32 with special security settings. Since every compute node 10 in the multi-node system 30 boots using the BIOS of the primary node, only the CRTM on the primary node will be used during any one boot. Whenever a secondary node is configured as the primary node, BIOS code and security settings from this newly configured primary node are executed and implemented during the next boot.

Figure 5:
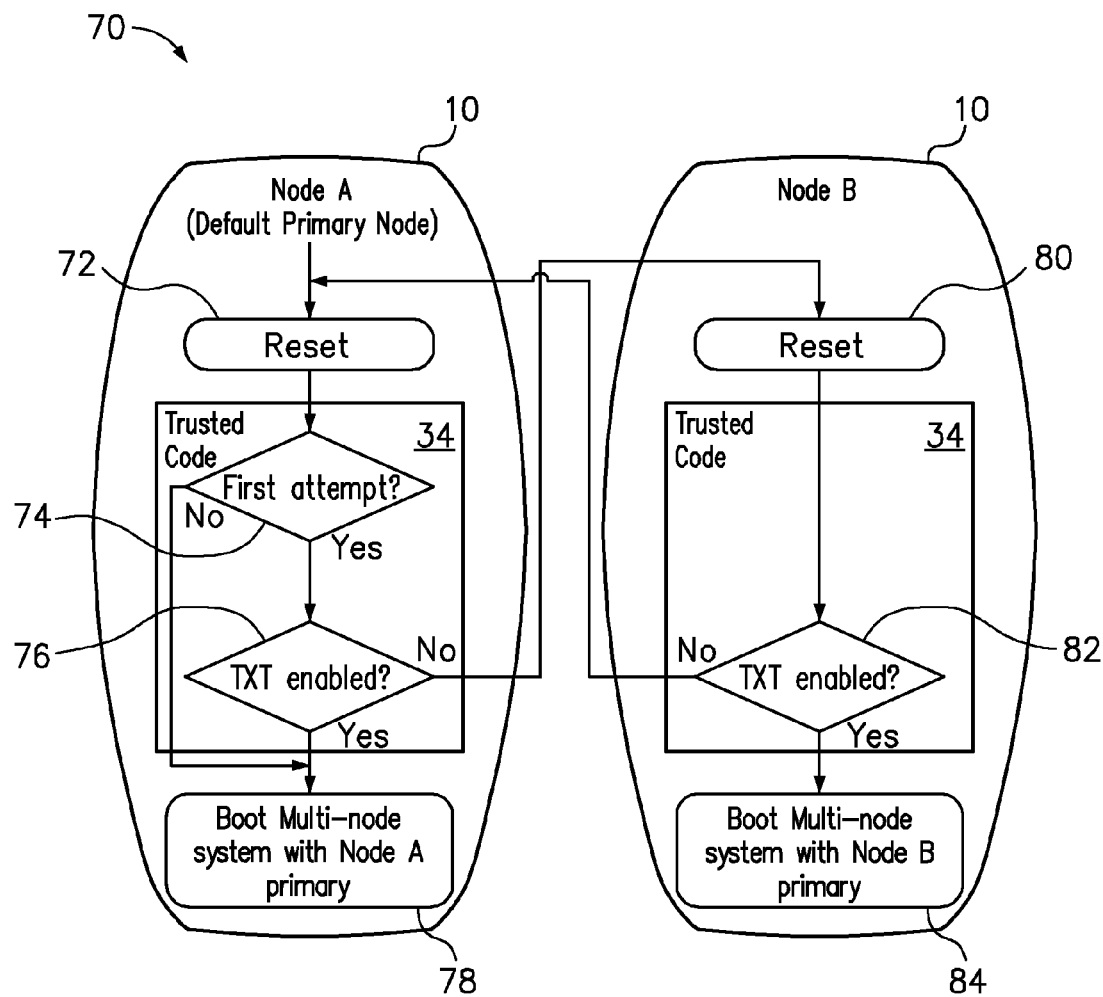
FIG. 5 is a flowchart of a method in accordance with one embodiment of the present invention.

FIG. 5 is a flowchart of a method 70 in accordance with one embodiment of the present invention. In this non-limiting example, it is assumed that a user has used an IMM interface to establish Node A as the preferred or default primary node, and that the IMM has already configured the hardware to make Node A the primary node using the FPGA. As previously described, the FPGA in each node is configured to point to the BIOS of the node that is currently the primary node. If a different node becomes the primary node, then the IMM instructs the FPGA to be reconfigured to point to the BIOS of the newly designated primary node. Still further, in this non-limiting example, the security setting criteria is a predetermined minimum security setting, specifically requiring that a primary node must have TXT enabled.

In step 72, the IMM on the current primary node (Node A) releases reset on the multi-node system, such that the CPU in the current primary node (Node A) starts booting or running the BIOS code (starting from the code in the CRTM). In step 74, the CRTM code determines whether this is the first attempt for Node A to boot. If this is the first attempt for Node A to boot, then the method proceeds to step 76 where the CRTM code determines whether Node A has TXT enabled (i.e., the predetermined minimum security setting). If Node A has TXT enabled, then, in step 78, the multi-node system is booted with Node A as the primary node, such that every node in the multi-node system will have TXT enabled.

However, if Node A does not have TXT enabled, then the BIOS code of Node A, or perhaps the CRTM code within the BIOS code, requests the IMM to switch Node A to a secondary node and make Node B the primary node. The IMM makes this switch using the FPGA. The method then proceeds to step 80 to reset Node B, which starts running the CRTM code in the BIOS of Node B. In step 82, the CRTM of Node B determines whether Node B has TXT enabled (i.e., the predetermined minimum security setting). If the CRTM of Node B determines that Node B has TXT enabled, then, in step 84, the multi-node system is booted with Node B as the primary node, such that every node in the multi-node system will have TXT enabled. However, if the CRTM of Node B determines that Node B does not have TXT enabled, then the BIOS or CRTM code of Node B will request the IMM to switch Node B to a secondary node and make Node A the primary node again. The method returns to step 72 to reset Node A and then the CRTM code of Node A determines, in step 74, whether this is the first attempt to boot Node A. Since this is a second attempt, the method will proceed to step 78 to boot the multi-node system with Node A as the primary node, such that every node in the multi-node system will have the same security settings as Node A. The number of attempts to boot a node may be stored in non-volatile memory.

Figure 6:
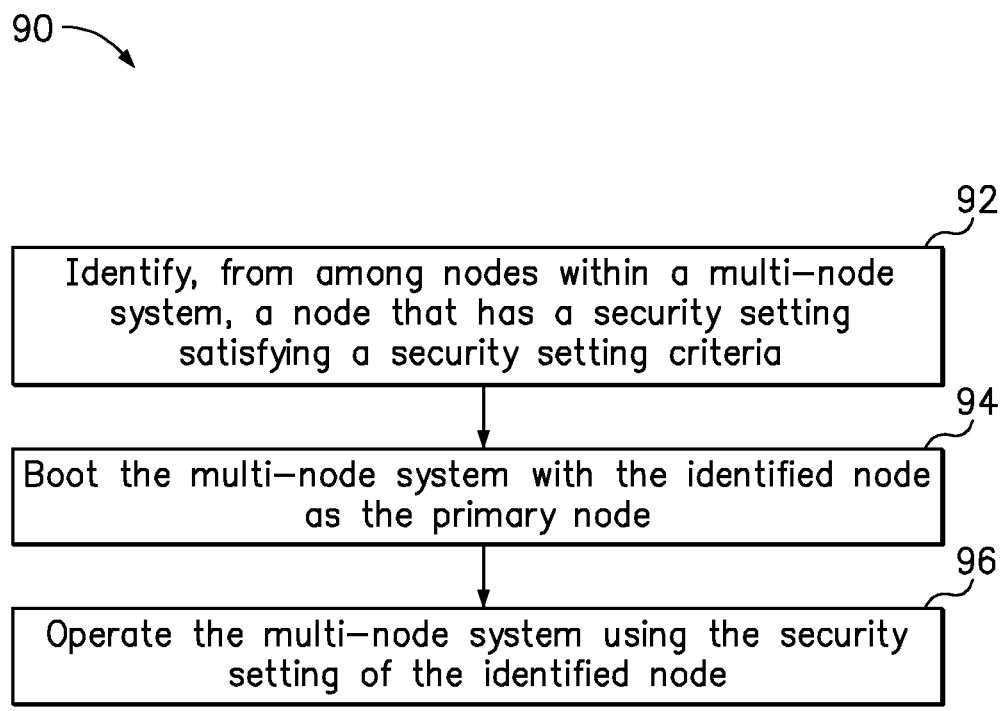
FIG. 6 is a flowchart of a method in accordance with another embodiment of the present invention.

FIG. 6 is a flowchart of a method 90 in accordance with one embodiment of the present invention. In step 92, the method identifies, from among the nodes within a multi-node system, a node that has a security setting satisfying a security setting criteria. In step 94, the method boots the multi-node system with the identified node as the primary node. Then, the multi-node system is operated using the security setting of the identified node in step 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   identifying, from among nodes within a multi-node system, a node that has a security setting satisfying a security setting criteria, wherein the security setting criteria includes a predetermined minimum security setting selected from the group consisting of a setting that enables trusted execution technology, a trusted execution technology setting, and a setting that authenticates the node and an operating system of the node;
   booting the multi-node system with the identified node as a primary node, wherein each node of the multi-node system boots using the basic input output system of the primary node; and
   operating the multi-node system using the security setting of the identified node.

2. The method of claim 1, wherein the multi-node system includes more than two nodes.

3. The method of claim 2, wherein the more than two nodes are fully meshed.

4. The method of claim 1, wherein the security setting of the identified node is stored in a trusted platform module.

5. The method of claim 1, wherein each node within the multi-node system stores a security setting in a trusted platform module within the node.

6. The method of claim 1, wherein each node within the multi-node system stores a security setting in non-volatile memory directly accessible to a trusted platform module within the node.

7. The method of claim 1, wherein the security setting criteria is the highest security setting among all nodes within the multi-node system.

8. The method of claim 1, further comprising:
   establishing a default primary node; and
   booting the multi-node system with the default primary node in response to none of the nodes having a security setting satisfying the security setting criteria.

9. The method of claim 8, wherein establishing a default primary node includes receiving user input identifying the default primary node.

10. A method, comprising:
    identifying, from among nodes within a multi-node system, a node that has a security setting satisfying a security setting criteria;
    setting a field-programmable gate array in each compute node to point to the basic input output system of the compute node identified as the primary node;
    booting the multi-node system with the identified node as a primary node, wherein each node of the multi-node system boots using the basic input output system of the primary node; and
    operating the multi-node system using the security setting of the identified node.

11. The method of claim 10, wherein each field-programmable gate array is set by an integrated management module within the same compute node as the field-programmable gate array.

12. The method of claim 11, wherein each compute node has an integrated management module, and wherein each of the integrated management modules in the multi-node system coordinate control of the field-programmable gate arrays to point to one of the compute nodes as the primary node.

13. A method, comprising:
    identifying, from among nodes within a multi-node system, a node that has a security setting satisfying a security setting criteria, including sequentially designating the nodes as the primary node until reaching a node that has a security setting satisfying the securing setting criteria;
    booting the multi-node system with the identified node as a primary node, wherein each node of the multi-node system boots using the basic input output system of the primary node; and operating the multi-node system using the security setting of the identified node.

14. The method of claim 13, further comprising:
establishing a default primary node; and
booting the multi-node system with the default primary node in response to none of the nodes having a security setting satisfying the security setting criteria.

15. A computer program product comprising a non-transitory computer readable storage medium having program instructions embodied therewith, the program instructions executable by a processor to cause the processor to perform a method comprising:
identifying, from among nodes within a multi-node system, a node that has a security setting satisfying a security setting criteria;
setting a field-programmable gate array in each compute node to point to the basic input output system of the compute node identified as the primary node;
booting the multi-node system with the identified node as a primary node, wherein each node of the multi-node system boots using the basic input output system of the primary node; and
operating the multi-node system using the security setting of the identified node.

16. The computer program product of claim 15, wherein the multi-node system includes more than two nodes.

17. The computer program product of claim 15, wherein the security setting of the identified node is stored in a trusted platform module.

18. The computer program product of claim 15, wherein each node within the multi-node system stores a security setting in a trusted platform module within the node.

19. The computer program product of claim 15, wherein the security setting criteria includes a predetermined minimum security setting.

20. The computer program product of claim 15, the method further comprising:
establishing a default primary node; and
booting the multi-node system with the default primary node in response to none of the nodes having a security setting satisfying the security setting criteria.

* * * * *